(12) United States Patent
Lim et al.

(10) Patent No.: US 7,758,029 B2
(45) Date of Patent: Jul. 20, 2010

(54) CUTTING BOARD WITH REPLACEABLE CUTTING SHEETS

(75) Inventors: Gary M. Lim, Palos Verdes Peninsula, CA (US); Mark H. Bevan, Pasadena, CA (US)

(73) Assignee: Seville Classics Inc., Torrance, CA (US)

( * ) Notice: Subject to any disclaimer, the term of this patent is extended or adjusted under 35 U.S.C. 154(b) by 232 days.

(21) Appl. No.: 12/069,032

(22) Filed: Feb. 7, 2008

(65) Prior Publication Data

US 2009/0200723 A1    Aug. 13, 2009

(51) Int. Cl.
*B23Q 3/00*    (2006.01)
(52) U.S. Cl. .................. 269/289 R; 269/302.1
(58) Field of Classification Search ............. 269/289 R, 269/302.1
See application file for complete search history.

(56) References Cited

U.S. PATENT DOCUMENTS

| 5,626,067 | A | * | 5/1997 | Lothe | ........................... 83/761 |
|---|---|---|---|---|---|
| 5,984,294 | A |  | 11/1999 | Bgomolny | |
| 6,422,551 | B1 | * | 7/2002 | Brotz | ..................... 269/289 R |
| 6,651,970 | B2 |  | 11/2003 | Scott | |
| 7,036,809 | B1 | * | 5/2006 | Mitchell | ................. 269/289 R |
| 7,125,011 | B2 | * | 10/2006 | McLaughlin | ............ 269/289 R |
| 7,213,806 | B2 | * | 5/2007 | Mitchell | ................. 269/289 R |
| 2002/0195763 | A1 | * | 12/2002 | Benjamin | ............... 269/289 R |
| 2003/0067105 | A1 |  | 4/2003 | Chen | |
| 2004/0217533 | A1 |  | 11/2004 | Mok | |
| 2005/0248075 | A1 | * | 11/2005 | McLaughlin | ............ 269/289 R |
| 2007/0267800 | A1 | * | 11/2007 | Zeng | ........................ 269/302.1 |
| 2009/0014935 | A1 | * | 1/2009 | Zeng | ........................ 269/302.1 |
| 2009/0200723 | A1 | * | 8/2009 | Lim et al. | ............... 269/289 R |

* cited by examiner

*Primary Examiner*—Lee D Wilson
(74) *Attorney, Agent, or Firm*—Raymond Sun

(57) ABSTRACT

A cutting board assembly has a housing that has a plurality of side walls, a top wall and bottom wall that together define an internal storage space. The top wall has a cutting surface, and the bottom wall has at least one vent opening. A plurality of cutting sheets are stored inside the storage space.

10 Claims, 5 Drawing Sheets

CUTTING BOARD WITH REPLACEABLE CUTTING SHEETS

BACKGROUND OF THE INVENTION

1. Field of the Invention

The present invention relates to cutting boards that are used for cutting food items and ingredients.

2. Description of the Prior Art

Cutting boards are commonly used for food preparation and provide an acceptable cutting surface that does not cause dulling of knives and prevents food from slipping on the cutting surface. Conventional cutting boards are usually wooden boards that a user would use to cut different types of food. Unfortunately, this could lead to cross-contamination. For example, raw vegetables should not be prepared on the same surface as uncooked meat. Cooked meats should not be sliced on surfaces that have been exposed to raw meat. Ideally, different surfaces should be used for different food preparation tasks, but it is expensive and inconvenient to purchase and use multiple cutting boards for use.

Efforts have been made to address this problem. One approach has been to provide replaceable cutting surfaces for a cutting board, such as those shown and described in U.S. Pat. Nos. 5,984,294 and 6,651,970. Another approach has been to provide multiple cutting boards within a cutting board assembly, such as those shown and described in U.S. Pat. Nos. 7,036,809 and 7,125,011, and U.S. Pub. Nos. 2004/0217533, 2003/0067105 and 2002/0195763.

Thus, there still remains a need for providing multiple surfaces for a cutting board assembly in a manner which is cost-effective, and convenient to use.

SUMMARY OF THE DISCLOSURE

To accomplish the objectives set forth above, the present invention provides a cutting board assembly having a housing that has a plurality of side walls, a top wall and bottom wall that together define an internal storage space. The top wall has a cutting surface, and the bottom wall has at least one vent opening. A plurality of cutting sheets are stored inside the storage space.

DETAILED DESCRIPTION OF THE PREFERRED EMBODIMENTS

Figure 1:
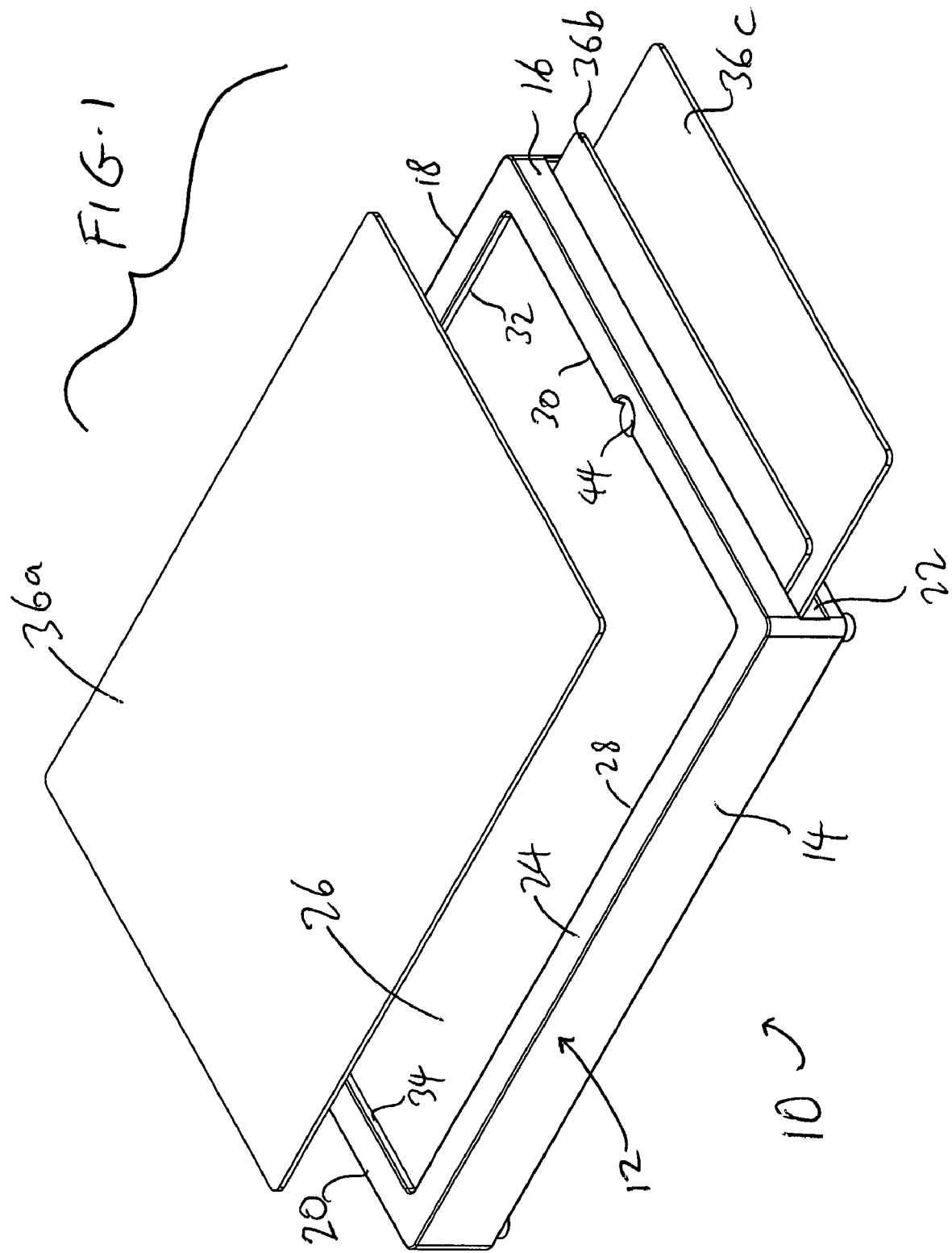
FIG. 1 is an exploded top perspective view of a cutting board of the present invention shown in use with a plurality of cutting sheets.
Figure 2:
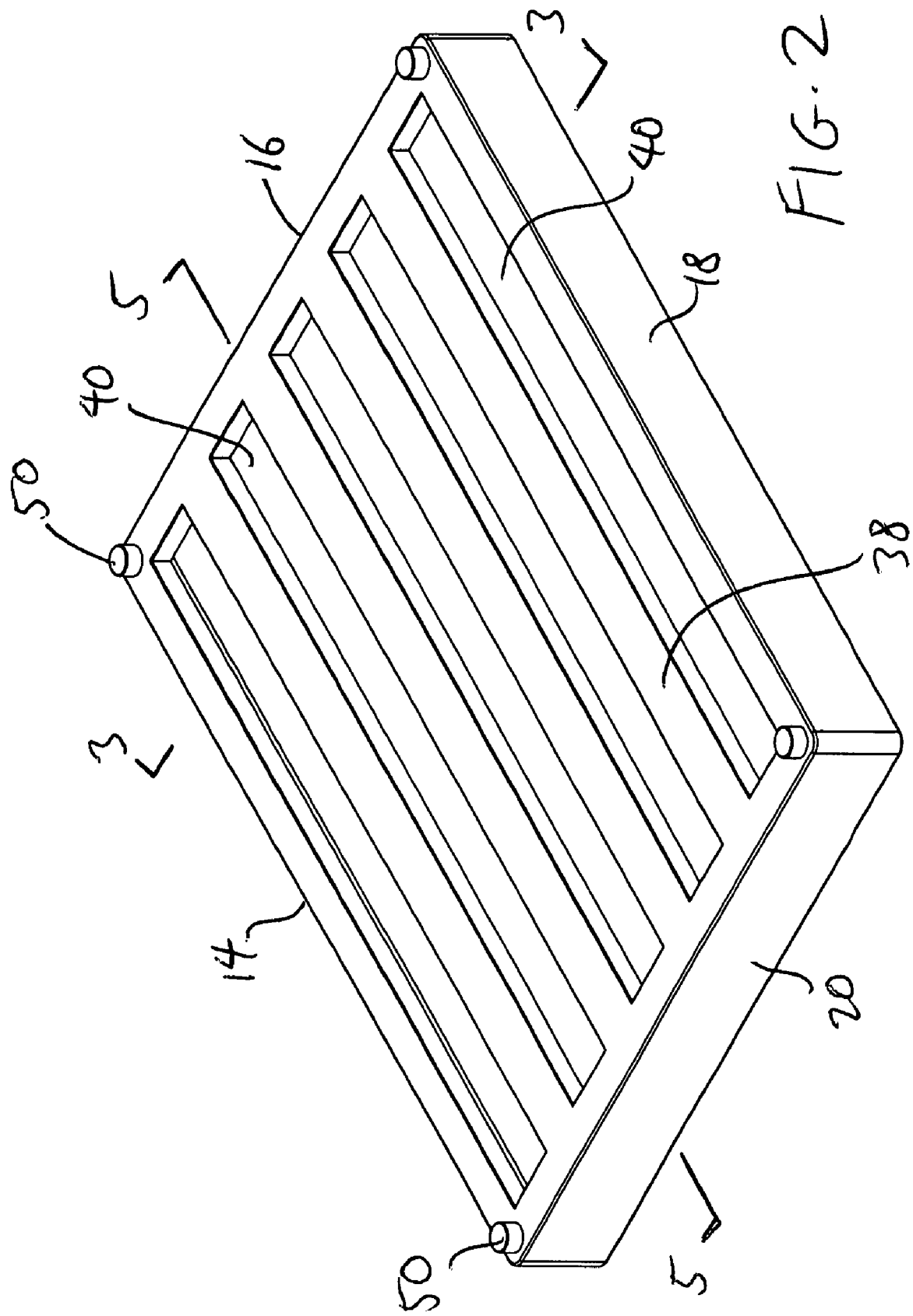
FIG. 2 is a bottom perspective view of the cutting board of FIG. 1.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The cutting board 10 according to the present invention has a generally rectangular four-sided housing 12 that has four side walls 14, 16, 18 and 20. The side wall 16 can have an elongated opening 22 extending lengthwise. The top wall 24 of the housing 12 has a smooth and continuous recessed surface 26 that is defined by inner edges 28, 30, 32, 34 of the top wall 24. A bottom wall 38 is connected to the bottom edges of the side walls 14, 16, 18, 20. A plurality of elongated slots 40 are provided on the bottom wall 38, and legs 50 can be provided at the corners of the bottom wall 38 to raise the bottom wall 38 slightly above a support surface (such as a table or counter top). The legs 50 can be provided in the form of rubber pieces that provide better traction against sliding during use of the cutting board 10.

Figure 3:
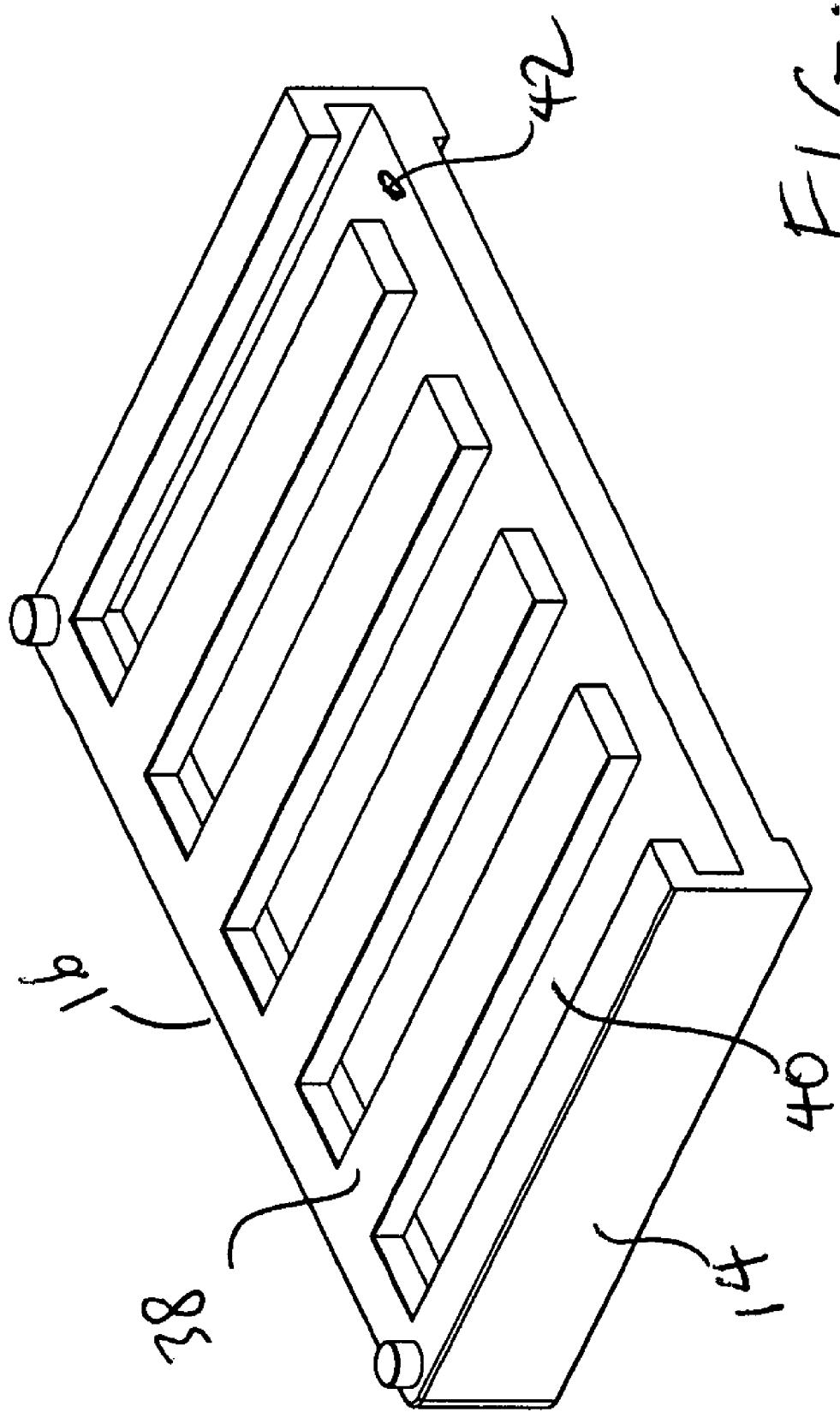
FIG. 3 is a bottom cross-sectional perspective view of the cutting board of FIG. 2 taken along the lines 3-3 thereof.
Figure 4:
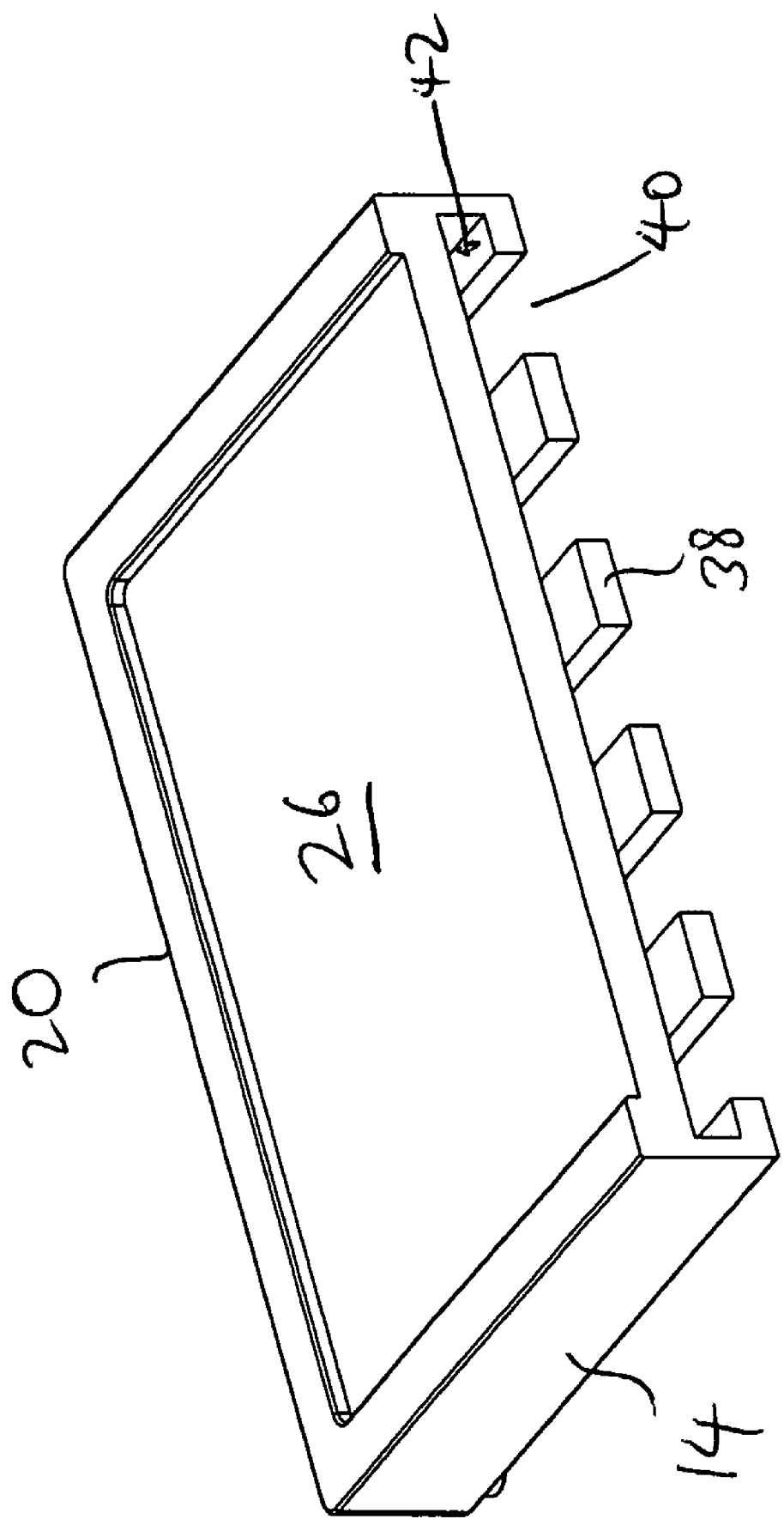
FIG. 4 is a top cross-sectional perspective view of the cutting board of FIG. 3.
Figure 5:
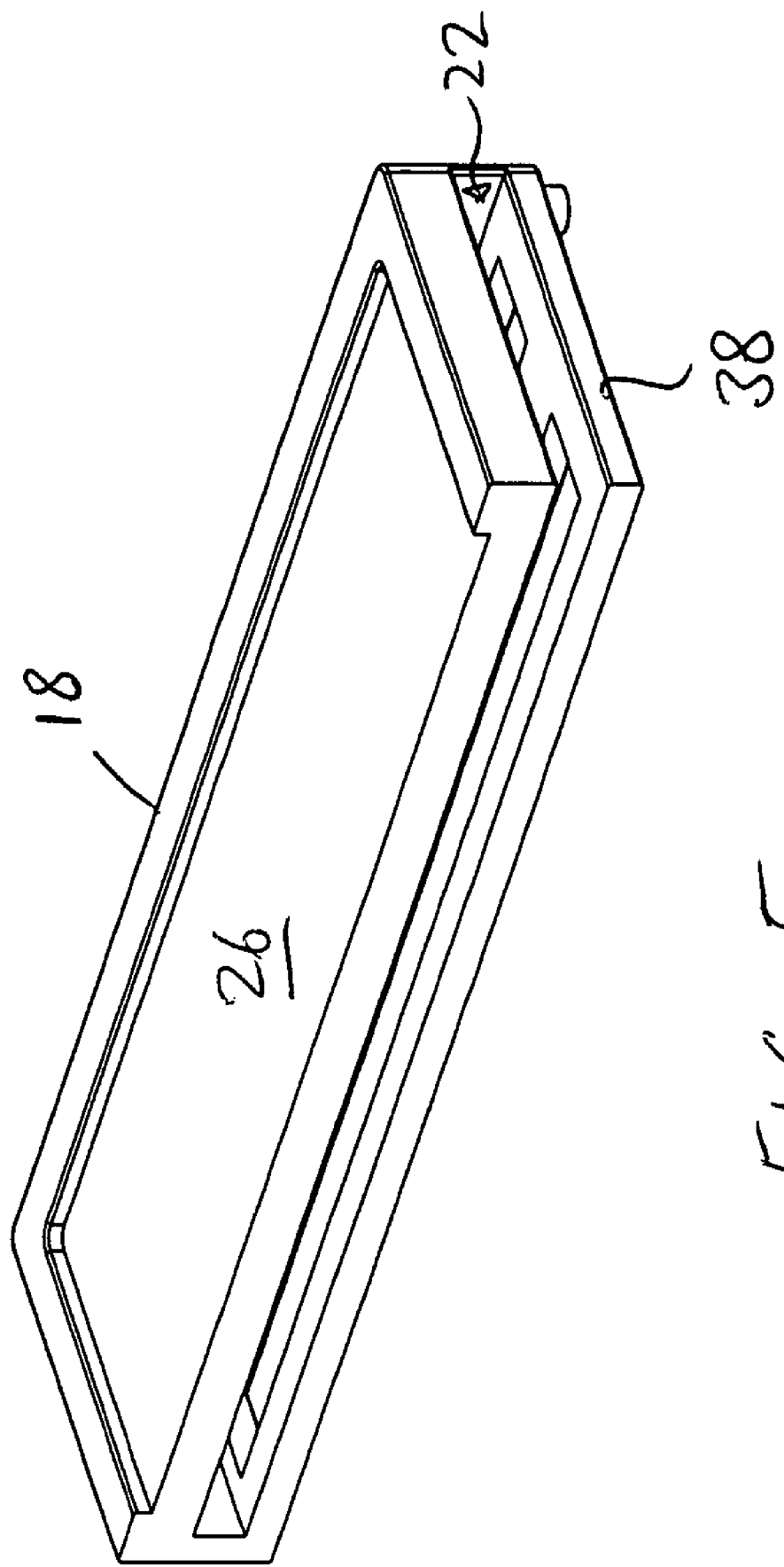
FIG. 5 is a top cross-sectional perspective view of the cutting board of FIG. 2 taken along the lines 5-5 thereof.

An internal space 42 (see FIG. 3) is defined by the side walls 14, 16, 18, 20, the bottom wall 38 and the top wall 24. A plurality of cutting sheets 36a, 36b, 36c are provided with the cutting board 10. All of the cutting sheets 36a, 36b, 36c can be stored in the space 42 by accessing the opening 22, which has a length that is slightly larger than the width of the cutting sheets 36a, 36b, 36c, and a height that will allow several of the cutting sheets 36a, 36b, 36c to be passed through the opening 22. The recessed surface 26 is sized and configured to fit the dimensions and shape of a cutting sheet 36a to allow the cutting sheet 36a to be rested securely thereon without the need for the use of any adhesive. Alternatively, an adhesive or locking member (e.g., a latch) can be provided to secure the cutting sheet 36a against the recessed surface 26. An indent 44 can be provided in an edge 30 to allow the user to slip a finger into the indent 44 to easily remove the cutting sheet 36a.

The housing 12 can be made of any solid material, such as but not limited to bamboo, wood, or plastic. The housing 12 can even be made of metal, or be made of two or more different types of materials. For example, the top wall 24 can be made of wood, with the side walls 14, 16, 18, 20 and the bottom wall 38 made of metal sheets. The metal sheets can be perforated or have one or more openings to allow for venting.

The cutting sheets 36a, 36b, 36c are preferably provided with a smooth, continuous bottom surface that meets the recessed surface 26 in a flat, smooth layered fashion. The cutting sheets 36a, 36b, 36c can be made of a plastic material such as a high-density polyethylene, polypropylene, polyvinyl chloride (PVC), acrylonitrile butadiene styrene (ABS). The thickness of each cutting sheet 36a, 36b, 36c can be between 0.5 mm and 15 mm, depending on the intended uses.

The cutting sheets 36a, 36b, 36c can be provided in different colors to coincide with different food groups. For example, green for produce, blue for fish, red for raw meats, yellow for raw poultry and brown for cooked foods. In use, the cutting sheets 36a, 36b, 36c can be stored inside the space 42. When a user desires to cut or prepare a first type of food, the user can select the appropriate cutting sheet 36a, 36b or 36c, place it on the recessed surface 26, and start working on the food. When the user desires to prepare or cut a second different type of food, the user washes the first cutting sheet 36a, 36b or 36c, returns it to the space 42, and removes the cutting sheet 36a, 36b or 36c that is appropriate for the second type of food. The open slots 40 at the bottom wall 38 allow for venting of outside air to the space 42 so that the cleaned cutting sheets 36a, 36b or 36c (which are wet from being washed) can dry more quickly and effectively.

Thus, the present invention provides a single cutting board assembly that (i) has a recessed surface 26 that can be used in a hygienic way to prepare and cut multiple food items using different cutting sheets 36a, 36b, 36c, (ii) allows for compact and convenient storage of the cutting sheets 36a, 36b, 36c, and (iii) effectively vents the stored cutting sheets 36a, 36b, 36c.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A cutting board assembly, comprising:
    a housing having a plurality of side walls, a top wall and bottom wall that together define an internal storage space with an opening the top wall having a recessed cutting surface, and the bottom wall having a plurality of vent openings; and
    a plurality of cutting sheets stored inside the storage space where said plurality of cutting sheet is removably inserted through said opening.

2. The assembly of claim 1, wherein the cutting surface has a size and a shape that corresponds to the size and shape of the cutting sheets.

3. The assembly of claim 1, wherein said plurality of said vent openings is parallel.

4. The assembly of claim 1, wherein each cutting sheet has a different color.

5. The assembly of claim 1, further including a plurality of feet provided on the bottom wall.

6. A cutting board assembly, comprising:
    a housing having a plurality of side walls, a top wall and bottom wall that together define an internal storage space with an opening, the top wall having a cutting surface; and
    a plurality of cutting sheets stored inside the storage space;
    wherein the cutting surface is recessed and has a size and a shape that corresponds to the size and shape of the cutting sheets; wherein the bottom wall has a plurality of vent openings.

7. The assembly of claim 6, wherein one of the sidewalls has said opening through which a cutting sheet can be slid into the storage space.

8. The assembly of claim 6, wherein each cutting sheet has a different color.

9. The assembly of claim 6, further including a plurality of feet provided on the bottom wall.

10. A cutting board assembly, comprising:
    a housing having a plurality of side walls, a top wall and bottom wall that together define an internal storage space, the top wall having a cutting surface, and the bottom wall having a plurality of vent openings;
    a plurality of feet provided on the bottom wall; and
    a plurality of cutting sheets stored inside the storage space, each cutting sheet having a different color;
    wherein the cutting surface is recessed and has a size and a shape that corresponds to the size and shape of the cutting sheets; and
    wherein one of the sidewalls has an opening through which a cutting sheet can be slid into the storage space.

\* \* \* \* \*